June 24, 1941.  E. D. DALL  2,246,781

AUTOMOBILE DOOR LOCKING STRUCTURE

Filed April 3, 1939  5 Sheets—Sheet 2

Inventor
Edward D. Dall.
by Charles H. Sills
Atty.

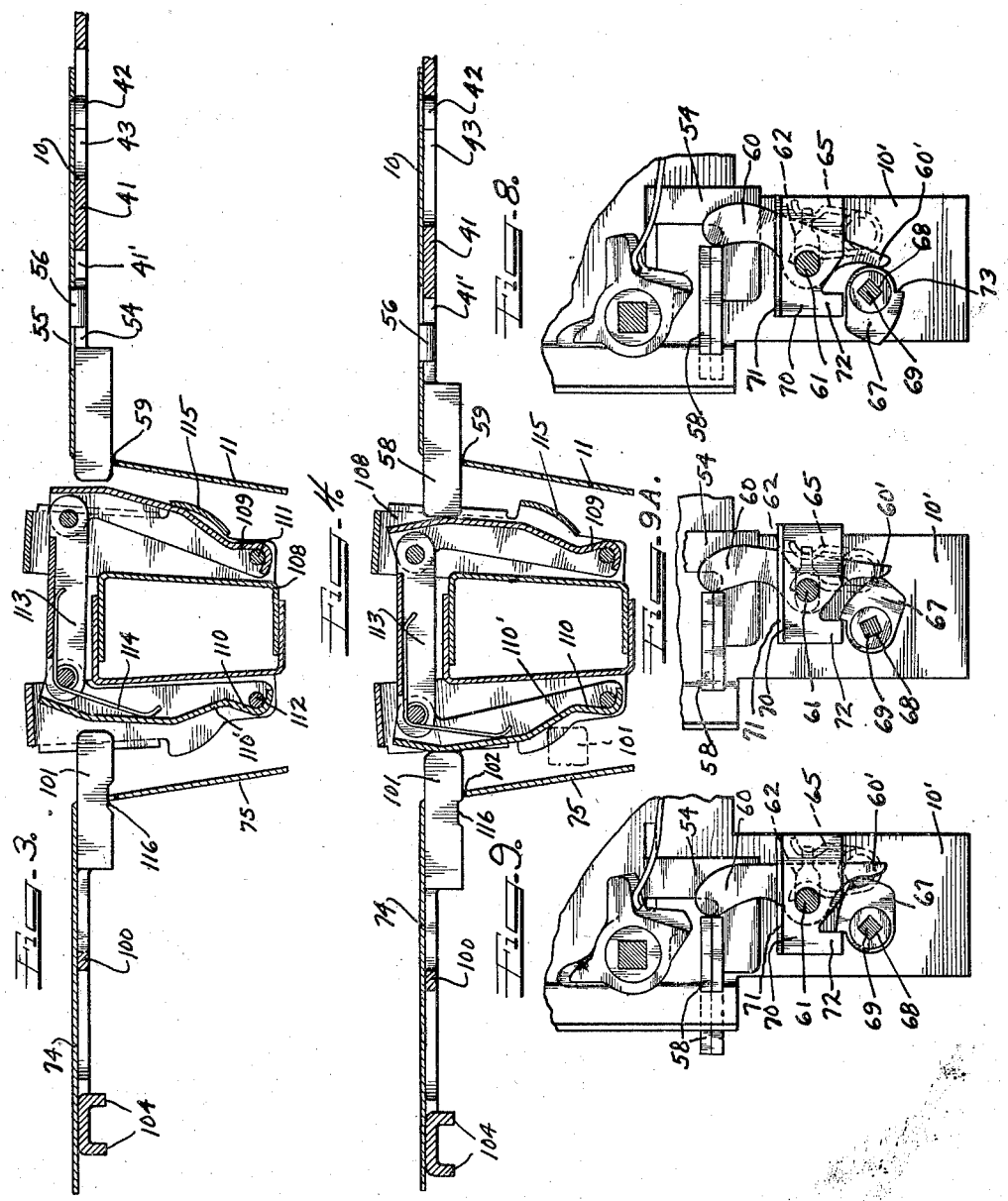

June 24, 1941.  E. D. DALL  2,246,781
AUTOMOBILE DOOR LOCKING STRUCTURE
Filed April 3, 1939  5 Sheets-Sheet 4
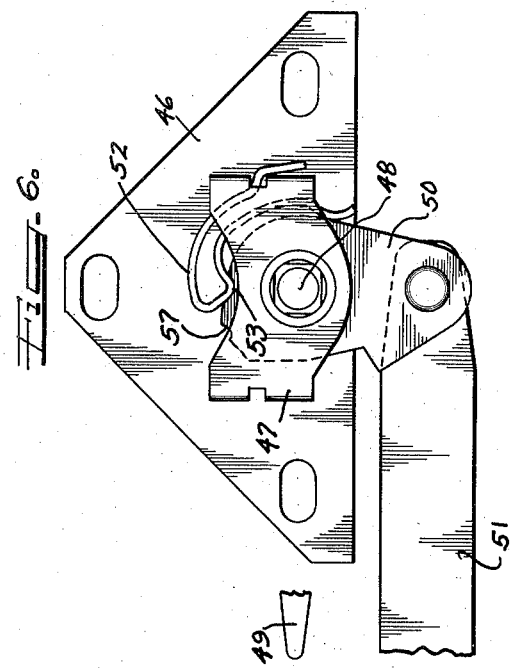
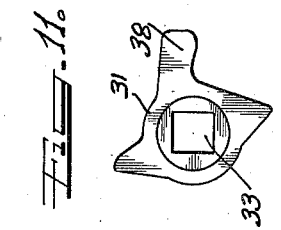
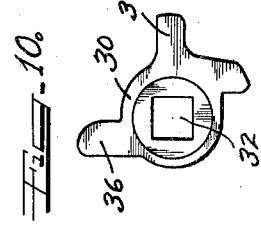
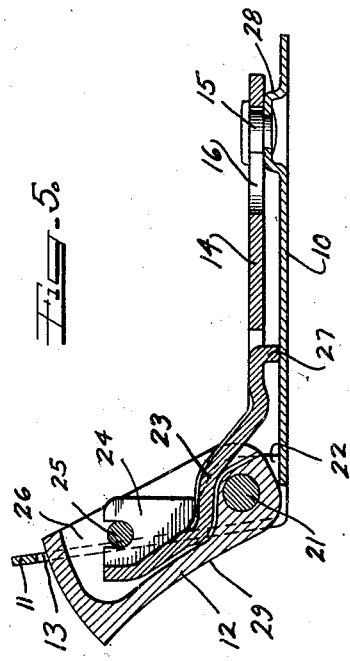
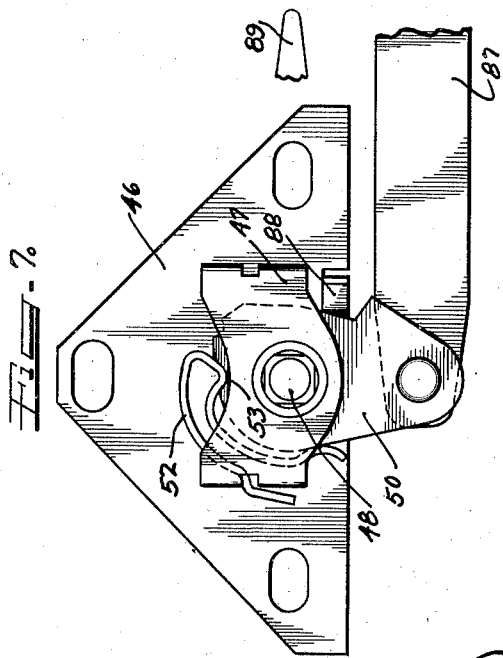
Inventor
EDWARD D. DALL.
by Charles H. Hills
Attys.

June 24, 1941.   E. D. DALL   2,246,781
AUTOMOBILE DOOR LOCKING STRUCTURE
Filed April 3, 1939   5 Sheets-Sheet 5
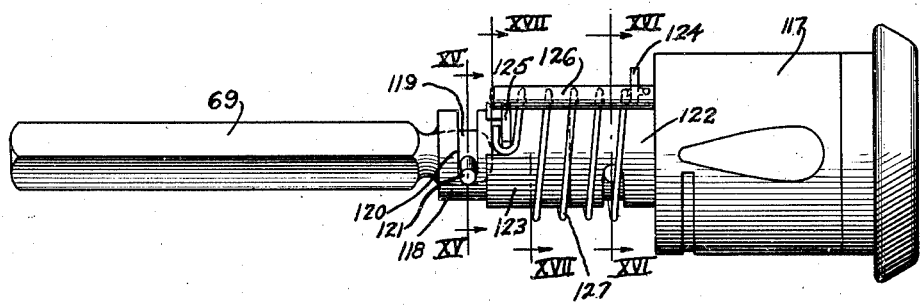
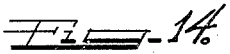
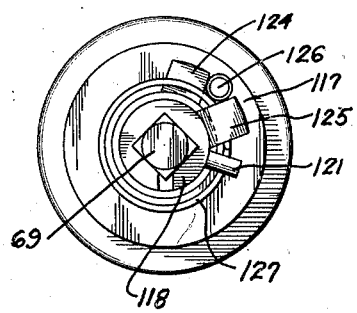
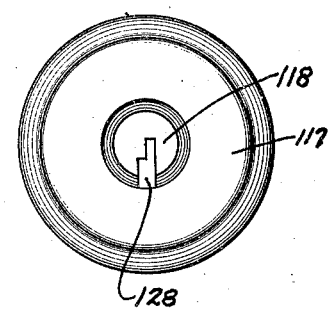
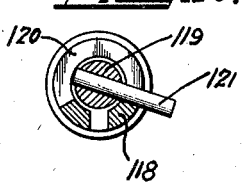
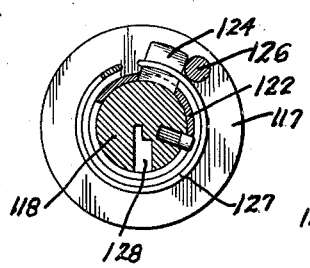
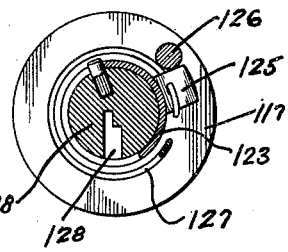
Inventor
EDWARD D. DALL.
by Charles H. Ville Atty.

Patented June 24, 1941

2,246,781

UNITED STATES PATENT OFFICE 2,246,781

AUTOMOBILE DOOR LOCKING STRUCTURE

Edward D. Dall, Detroit, Mich., assignor to Walter F. Wright, Cleveland, Ohio

Application April 3, 1939, Serial No. 265,623

20 Claims. (Cl. 70—264)

This invention relates to locking structure for doors of vehicles such as automobiles.

An important object of the invention is to produce simple latching structure for each door of an automobile operable in the ordinary manner for unlatching by either the outside handle or the inside handle of the door, but with interconnecting means on each side of the car for intercooperation of the latch structures on the front and rear doors of that side of the car so that the driver of the automobile may control the locking of the rear door against unlatching by either its outside or inside handle and the front door locking against unlatching by its outside handle, the control operable by the driver being the inside handle on the front door or key control means on the front door operable from the outside thereof.

A further important object of the invention is to provide such operation and cooperation of the latch structures on the doors of each side of the vehicle, that, under abnormal setting or manipulations slamming shut of the doors from the outside thereof will not lock the driver out of the vehicle.

My invention incorporates a number of features of construction, operation, and control all of which are embodied in the structure disclosed on the drawings, in which drawings:

Figure 3 is a sectional view taken substantially on plane III—III Figure 1;

Figure 4 is a section taken substantially on plane IV—IV Figure 2;

Figure 5 is a section on plane V—V Figure 1;

Figure 6 is an elevation view of the inside door handle mechanism on the front door;

Figure 7 is an elevation view of the inside handle mechanism on the rear door;

Figure 8 is an outside elevation of part of the front door lock structure showing key operable locking mechanism in unlocking position;

Figure 9 is a view similar to Figure 8 showing the locking mechanism in locking position;

Figure 9a is a view similar to Figures 8 and 9 but showing the locking mechanism in an intermediate position;

Figure 10 is a plan view of one of the roll-back members;

Figure 11 is a plan view of the other roll-back member;

Figure 12 is a side elevation of a tumbler lock structure for operation of the locking mechanism on the front door;

Figure 13 is an inner end view of the structure shown on Figure 12;

Figure 14 is an outer end view;

Figure 15 is a section on plane XV—XV Figure 12;

Figure 16 is a section on plane XVI—XVI Figure 12; and

Figure 17 is a section on plane XVII—XVII Figure 12.

Figure 1:
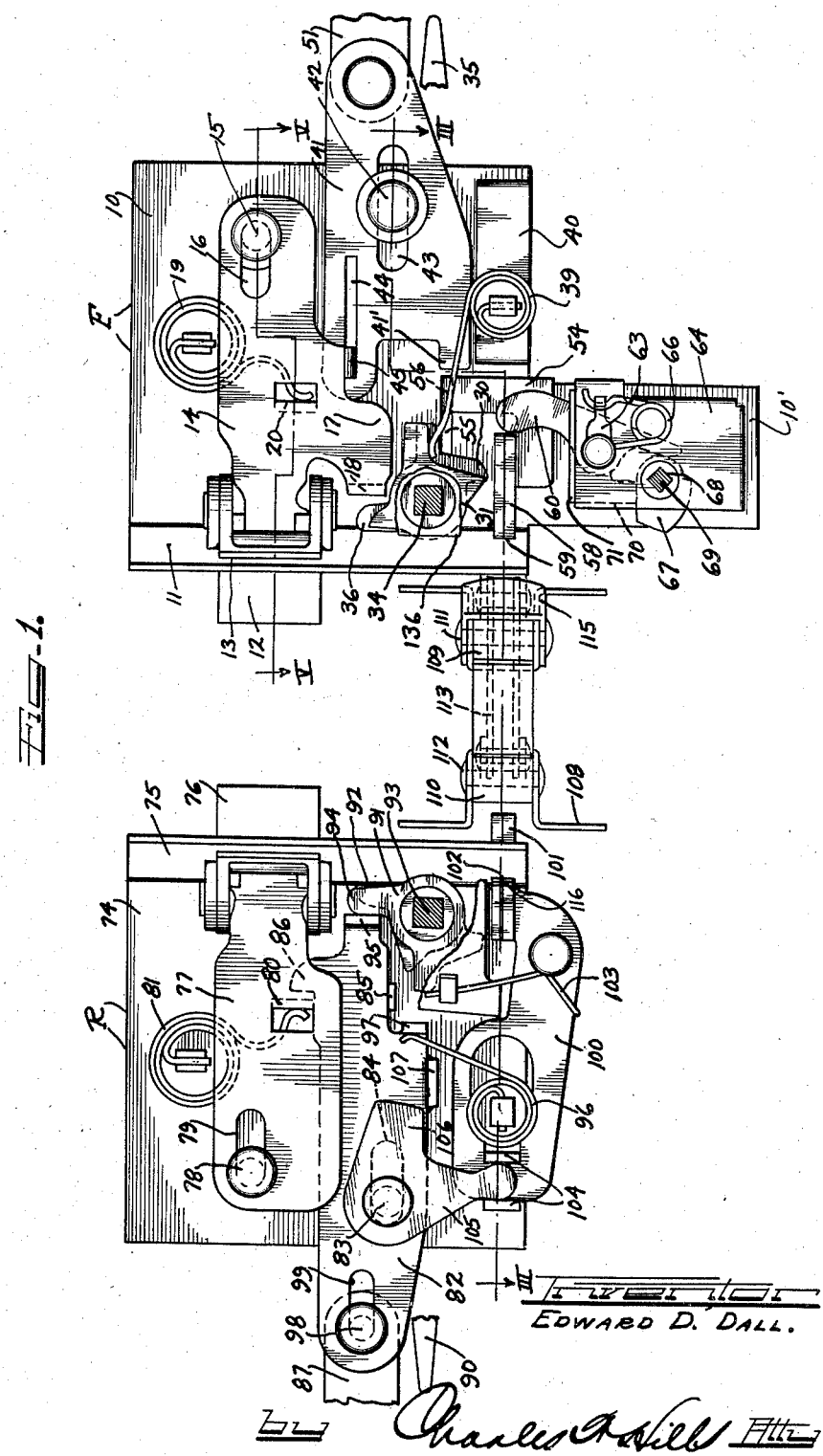
Figure 1 is an outer side view of the lock structures for the front and rear doors on one side of an automobile, and the interconnecting means within the car body between the lock structures, and showing the lock structures in normal position.
Figure 2:
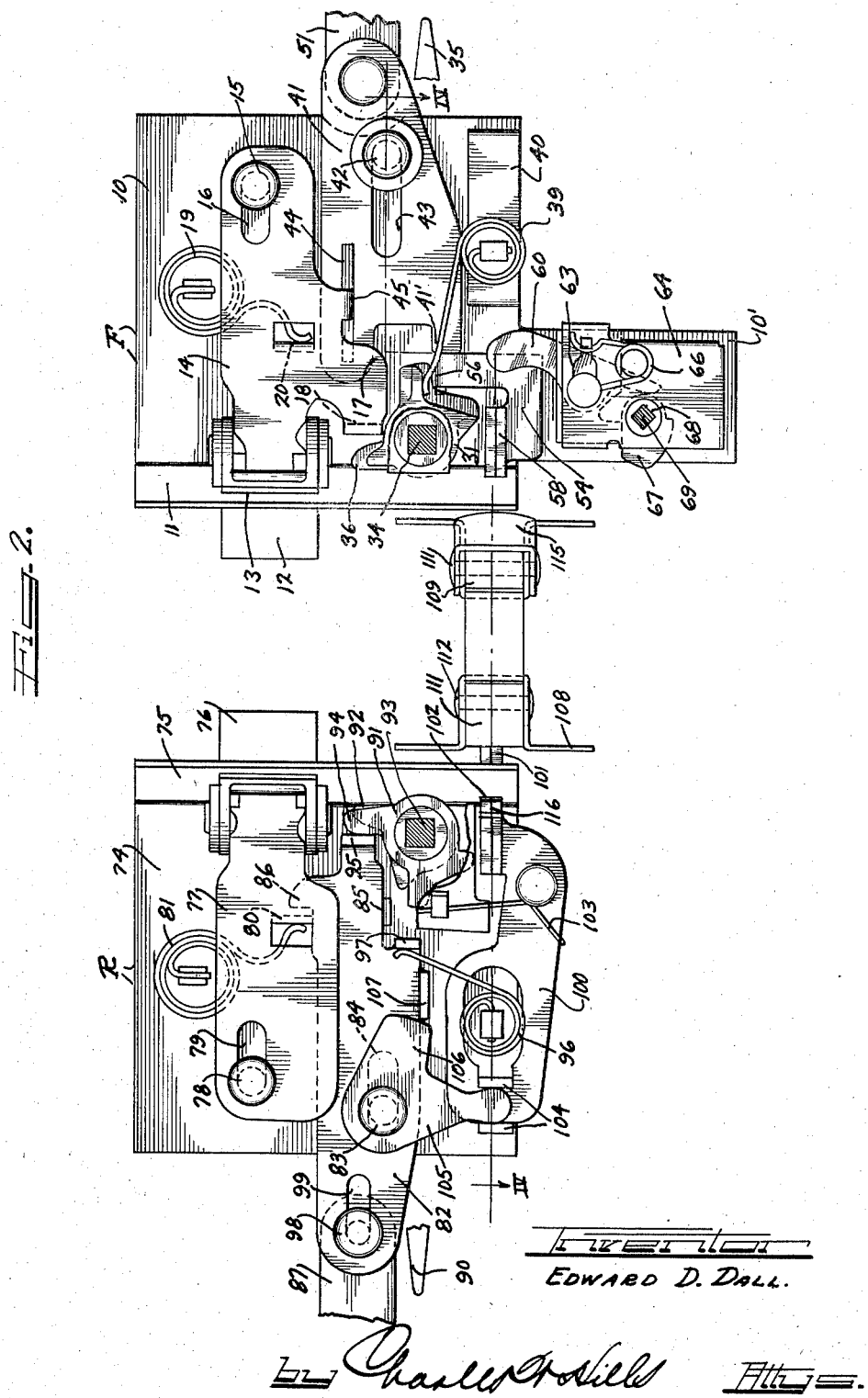
Figure 2 is a view similar to Figure 1 but showing the lock structures in locked condition.

Referring to Figure 1, F indicates the latch structure on the right front door of an automobile, and R indicates the latch structure on the right rear door, the front door being hinged to the car body along its forward edge and the rear door being hinged along its rear edge, with the usual post or stile of the car body between the free edges of the doors. The latch structure of the front door comprises a base plate 10 secured to the door frame, the plate having the outwardly extending flange 11 at its outer edge. A latch bolt 12 extends outwardly through the passageway 13 in the flange 11, the plate 14 extending from the latch bolt being guided by the latch bolt and by a pin 15 extending from the base plate 10 through the elongated slot 16 in the plate. The latch bolt plate 14 has the depending arm 17 which at its forward end is deflected toward the base plate 10 to form an abutment 18, for engagement by the roll-back structure. A coil spring 19 anchored on the base plate engages a tongue 20 deflected from the plate 14 and tends to shift the latch bolt structure outwardly to latching position, the extent of outward movement being limited by the engagement of the inner end of the slot 16 with the pin 15.

Referring particularly to Figure 5, the latch bolt structure shown is of the so-called Pullman type, the latch bolt or head 12 being hinged on a pin 21 journaled in ears 22 formed in the corner between the base plate 10 and the flange 11. The plate 14 has the diagonally extending outer end 23 provided with flanges 24 notched to receive the pins 25 extending across the recess 26 in the latch head. The plate 14 is spaced away from the base plate 10 and guided in its movement by the foot 27 deflected from the plate and by the seat part 28 deflected from the base plate 10. When the plate 14 is shifted inwardly, the latch head 12 will be swung on its hinge pin 21 inwardly through the passage 13 in the flange 11. When the door is swung shut, the comparatively long cam surface 29 on the outer face of the latch head will engage with the striker plate in the post between the doors to be deflected inwardly through the passage 13 until the striker plate latch opening has been passed, whereafter the spring 19 will function to shift the plate back to normal position for swing of the latch head into latching position.

The roll-back structure shown comprises the inner and outer members 30 and 31 (Figures 10 and 11), these members having the square passageways 32 and 33 respectively for receiving the spindle 34 to which the outside door handle 35 is secured. The roll-back members are journalled by their hubs in the base plate 10 and in a cover plate 136 mounted on the base plate.

The roll-back member 30 has the arm 36 extending upwardly between the base plate flange 11 and the abutment 18 on the latch bolt plate 14, and an arm 37 extends inwardly and spaced substantially 90° from the arm 36.

The outer roll-back member 31 has an inwardly extending arm 38 against whose underside engages the end of a coil spring 39 anchored on a raised portion 40 of the base plate 10. The arrangement is such that, when the handle spindle 34 is extended through the square openings of the roll-back members, the pressure of the spring on the outer roll-back member will tend to turn the spindle for abutting engagement of the inner roll-back member arm 36 against the flange 11 with the result that the roll-back members are clamped to the spindle and cannot rattle. When the outside door handle 35 is swung downwardly the roll-back structure will be rotated against the resistance of the spring 39 to bring the arm 36 of the inner roll-back member against the abutment 18 for retraction and unlatching of the latch bolt structure, and when the handle is released, the spring will return the handle to normal position with the roll-back arm 36 pressed against the flange 11 by the spring 39, the handle as well as the roll-back members being thus held at all times against loose or rattling movements.

Slidable horizontally on the base plate 10 below the latch bolt plate 14 is a slider plate 41 guided by a pin 42 extending from the base 10 through the longitudinally extending slot 43 in the plate. The upper part of the slider plate is slidable between the base plate and the plate 14 and has the longitudinally extending slot 44 into which projects a tongue 45 deflected from the plate 14, this slot and tongue connection serving as a further guide for the horizontal movement of the slider plate and serving also for retraction of the latch bolt structure by operation of the inside handle mechanism on the front door. This inside handle mechanism is shown on Figure 6. It comprises a supporting plate 46 secured to the front door and a plate 47 secured to and spaced from the plate 46, the base and the plate journalling the shaft 48 for the inside handle 49. Mounted on the shaft between the base and the plate is a lever 50 whose lower end is connected by a link 51 with the end of the slider plate 41. When the handle 49 is swung down for swing of the lever 50 and outward shift of the slider plate 41 on the base plate 10, the end of the slot 44 in the slider plate will engage with the tongue 45 on the latch bolt plate 14 and the latch bolt structure will be retracted for unlatching of the door.

A spring 52 normally engages in a detent notch 53 in the hub of the lever 50 and tends to hold the lever and the inside handle in the normal position with the slider plate normally positioned as shown on Figure 1. When the handle 49 is swung down to cause retraction of the latch bolt structure, such retraction will be against the resistance of the spring 19 and upon swing of the lever 50 the notch 53 will be displaced from the spring 52 which will then engage on the unbroken edge of the lever hub which is concentric with the axis of the handle shaft. Upon release of the inside handle after an unlatching operation, the spring 19 will restore the latch bolt structure and the slider plate 41 to the normal position and the spring will become re-engaged in the notch 53.

Slidable horizontally on the base plate 10 is a dogging plate 54 which is guided by engagement in a slot 55 in the base plate 10 of a tongue 56 deflected from the upper end of the dogging plate. This dogging plate is between the lower inner corner of the slider plate 41 and the inner latch bolt structure engaging roll-back member 30. Normally the dogging plate is displaced from the roll-back member but when the plate is shifted outwardly its upper end will be directly below the arm 37 of the roll-back member 30 so that the roll-back structure will be dogged against turning by the outside handle 35 and it will therefore be impossible to effect retraction of the latch bolt structure by the outside handle. Upon inward shift of the slider plate 41 it will engage with the dogging plate and shift to dogging position. Such shift of the slider plate results from upward swing of the inside handle 49 and corresponding swing of the lever 50 and movement of the link 51. After swing of the inside handle for shifting of the dogging plate, the spring 52 will engage in the detent notch 57 in the hub of the lever 50 and this spring will then tend to maintain the dogging condition of the roll-back structure. The slot 44 in the slider plate 41 is of sufficient length to permit such inward shift of the plate independently of the latch bolt plate 14. On account of the length of this slot 44, the latch bolt structure can be retracted by means of the outside door handle or when the door is swung shut without moving the slider plate 41. Means independent of the latch bolt structure and the slider plate 41 are provided for restoring the dogging plate 54 to undogging position. A pin 58 is secured to and extends horizontally outwardly from the dogging plate 54 and through a passageway 59 in the flange 11. When the dogging plate has been shifted into dogging position, as by operation of the inside handle 49, the dogging plate will not return to undogging position as a result of return of the inside handle to normal position, but will be restored to undogging position by inward shift of the pin 58 by means which will be described more in detail later.

The dogging plate may also be shifted into dogging position from the exterior of the front door, by key operated means. This means comprises a lever 60 which is fulcrumed by a pin 61 supported by the depending extension 10' on the base plate 10. Referring to Figures 1, 2, 8, and 9, the pin extends into a slot 62 in the extension 10' and into a slot 63 in the cover plate 64 mounted on the extension 10', so that the pin with the lever 60 mounted thereon is shiftable in the slots. Hairpin springs 65 and 66 are anchored to the cover plate and the extension 10' respectively and exert pressure against the ends of the pin tending to hold it at the forward ends of the slots.

A cam member 67 is suitably journalled between the extension wall 10' and the cover plate 64 and has the polygonal opening 68 through its hub for receiving a spindle 69 which at its outer end has connected thereto a key operable tumbler lock structure which will be described more in detail later, turning of the spindle 69 being controlled by the manipulation of the key in the lock. When the spindle is turned, the cam is cooperable with the tail 60' of the lever 60 for engagement of the upper end of the lever with the inner end of the pin 58 for shifting the pin outwardly and movement of the dogging plate 54 with the pin into dogging position relative to the roll-back member 30. With this arrangement the front door may be locked against opening from the outside by the dogging of the roll-back for the outside handle. Figure 8 shows the lock structure in normal position and Figure 9 shows the operation thereof for shifting out the dogging plate and pin.

Between the wall 10' and the cover plate 64 is a tripping member shown in the form of a rectangular plate 70 which receives the pin 61, and which has a guide flange 71 at its upper edge engaging with the top of the cover plate 64. At its outer lower corner the tripper plate presents a detent in the form of a tongue 72 for cooperating with a shoulder 73 on the cam 67. When the cam is turned by the key structure to swing the lever 60 for outward shift of the pin 58 and the dogging plate 54, the shoulder 73 will come into position behind the tongue 72. Now when pressure is exerted against the pin 58 to shift it inwardly, the lever 60 will be fulcrumed by its tail 60' against the end of the cam 67 and the lever will be swung inwardly on this fulcrum point and the pin 61 will shift inwardly in the slots 62 and 63 and the tripping plate 70 will be shifted inwardly, the tongue 72 of the plate by its engagement with the shoulder 73 on the cam then turning the cam in reverse direction as indicated by Figure 9a, such turning of the cam by the tripping plate being for a sufficient distance so that the pressure of the lever rounded tail 60' against the cam will snap swing it back for return to its normal position shown in Figure 8, and the dogging plate 54 will then have been moved back to its normal undogging position. Such snap-back action of the cam results because, as will appear in the description of the key operated lock shown in Figures 12 to 17, the spindle 69 is swiveled to the lock barrel and will offer no resistance to the snap-back movement of the cam.

This tripping of the key operated locking mechanism is principally for the purpose of preventing lockout. For example, the driver may turn the key to shift the dogging plate into dogging position while the door is still open, and then swing the door shut from the outside of the car, and if the dogging plate were not undogged, he would be locked out as the outside handle could not be operated to retract the latch bolt. However, when the door is swung shut with the pin 58 projecting, the pin will encounter means within the door post and will be shifted inwardly for tripping of the key operated mechanism and undogging of the dog plate. This operation will be referred to more in detail hereinafter in connection with the cooperation of the front and rear door latch structures.

Describing now the latch structure on the rear door. This lock comprises the base plate 74 having the flange 75 through which the lock bolt 76 projects. The lock bolt structure is of the type shown by Figure 5, the latch bolt plate 77 connected with the bolt being slidable horizontally on the base plate 74, being guided by the latch bolt and by a pin 78 engaging in the slot 79. The latch plate has a part deflected therefrom to form an abutment 80 which is engaged by a coil spring 81 which tends to hold the latch bolt structure in its outer or latching position.

Slidable horizontally on the base plate 74 is the slider plate 82 which is guided by a pin 83 extending from the base plate through the slot 84 in the slider plate, the plate being further guided by engagement with the ledge 85 of the base plate and by engagement of its upper edge with the under edge of the abutment 80, the plate having the upwardly extending abutment arm 86 in advance of the abutment 80 so that when the slider plate is drawn outwardly the arm will engage the abutment for retraction of the latch bolt structure, the slider plate being connected by a link 87 with the inside handle assembly for the rear door. This inside handle assembly is shown on Figure 7 and is substantially the same as the inside handle assembly for the front door shown on Figure 6 with the exception that the assembly of the rear door has a stop projection 88 on the base plate 46 which permits swing of the lever 50 and the inside door handle 89 only in one direction, namely, in the direction for clockwise rotation of the lever 50 (Figure 7) which movement will result in retraction of the latch bolt structure.

Retraction of the latch bolt structure by operation of the outside handle 90 is effected by roll-back structure comprising the outer and inner roll-back members 91 and 92 mounted on the shaft 93 of the outside handle. The upwardly extending arm 94 of the roll-back member 91 is normally engaged by the end 95 of the slider plate 82, a spring 96 anchored to the base plate 74 engaging with the abutment 97 on the slider plate tending to hold the plate with its end in pressure engagement with the roll-back member 92. The roll-back members are slightly offset so that the pressure of the slider plate against the arm 94 of the roll-back member 91 will tend to swing the roll-back member 92 against the flange 75 on the base plate but without engaging the arm 94 of the roll-back 91 with the flange so that the roll-back members will be caused to securely clamp the handle shaft 94 to prevent rattling. When the outside handle 90 is swung down (Figure 1) the roll-back 91 will shift the slider plate 82 rearwardly for engagement of its abutment arm 86 with the abutment 80 on the latch bolt structure for retraction of the latch bolt. Such rearward shifting of the slider plate may be independent of the link 87 as the pivot pin extending from the link engages in the slot 99 in the slider plate. When the inside handle 89 is operated the pin 98 will engage with the outer end of the slot for rearward shift of the slider plate 82 and retraction of the latch bolt. Slidable horizontally on the base plate 74 below the slider plate and the roll-back structure is a locking plate 100 having at its outer end a pin 101 projecting through a passageway 102 in the flange 75, a spring 103 tending to hold the plate and pin in outer position as shown on Figure 1. At its inner end the plate has upstanding ears 104 between which engages the depending leg of a dogging lever 105 pivoted on the pin 83, the outwardly extending leg 106 of the lever being cooperable with an abutment flange 107 on the slider plate 82. The lever leg 106 is normally above the path of the abutment flange, but when the lever is swung in clockwise direction by inward shift of the locking plate 100, the end of the leg 106 will be behind the abutment flange so as to prevent outward shift of the slider plate 82 by operation of the inside handle 89, as shown on Figure 2. Inward shift of the locking plate 100 therefore results in locking of the inside handle mechanism for the rear door so that the latch bolt structure cannot be retracted.

The mechanism within the door post for cooperation of the front and rear door locks for coincidental locking, is shown on Figures 1 to 4. It comprises a frame structure 108 mounted in the door post to be in alignment with the pins 58 and 101 of the latch structures. Flapper members 109, 110 are pivoted at their outer ends by pins 111 and 112 respectively on the frame 108, the inner ends of the flapper levers being connected by a link 113, a spring 114 tending to swing the flapper structure toward the front door, the swing being limited by a cam plate projection 115 on the frame 108. The normal position of the parts is shown on Figures 1 and 3, and Figures 2 and 4 show the arrangement when the latch structures are coincidentally locked.

Describing the operation, when both doors are shut, and the inner handle 49 for the front door is swung upwardly, the slider plate 41 will shift the dogging plate 54 to dog the roll-back of the front door so that the outside handle of this door will be ineffective to retract the latch bolt and the front door is locked against ingress. Upon outward shift of the dogging plate 54, the pin 58 will engage with the flapper 109 to swing the flapper, such swing being communicated by the link 113 to the flapper 110 which will be swung into engagement with the pin 101 of the rear door latch structure resulting in inward shift of the pin and the locking plate 100, and swing of the dogging lever 105 with its leg 106 into position behind the abutment 107 on the slider plate 82, so that this slider plate is locked against inward shift by the inside handle of the rear door and consequently the latch bolt structure cannot be withdrawn so that the rear door will be locked against egress. Locking of the slider plate 82 will also hold it in its normal position of engagement with the roll-back member 91 so that the outside handle 90 of the rear door will be ineffective to shift the slider plate 82 for retraction of the latch bolt structure and the rear door is thus also locked against ingress. To unlock the doors from the inside, the inside handle on the front door is swung back to normal position for withdrawal of the slider plate 41 out of the path of the dogging plate 54, and the spring 103 in the rear door latch structure will then become effective to shift the locking plate 100 back to normal position for release of the dogging lever 105 from the slider plate 82, and for engagement of the pin 101 with the door post flapper structure to restore this flapper structure to normal position and to shift the dogging plate 54 to undogging position in the front door lock, so that both doors will now be unlocked for unlatching either from the inside or from the outside.

If, after both doors are swung shut from the outside, key mechanism is operated for rotation of the spindle 69 on the front door, the lever 60 will be rotated to shift out the dogging plate 54 for locking of the outside handle of the front door, and for transmission of the movement of the pin 58 through the door post parts to the pin 101 and the locking plate 100 in the rear door latching structure for locking of the slider plate 82 to render the rear door handles ineffective to withdraw the latch bolt structure.

Provision is made for preventing lockout of the driver in case the doors are swung shut from the outside while their elements are not all in normal position. Suppose that the front door is swung shut while the dogging plate 54 is in dogging position and its pin 58 projected. Now when the door is swung shut, the pin will encounter the cam plate 115 provided on the door post fitting frame 108, and the pin and the dogging plate will be shifted back to normal position for undogging of the roll-back so that the door can be opened from the outside by turning of the outside handle. If the front door, before being swung shut, had been locked by operation of the inside handle, then when the door is swung shut and the dogging plate returned to normal, the slider plate 41 and the inside handle will also be restored to normal.

If the key means for the front door had been intentionally or unintentionally turned and the dogging plate and pin shifted out by the lever 60, while the door is open, then when the door is swung shut, the pin will encounter the cam plate 115 and be shifted back to normal position for undogging and release of the outside handle. As has been already explained, such inward shift of the pin will rock the lever 60 for inward shift thereof and the tripping plate 70 for restoring of the key operated lever operating cam to normal position, so that the key operable locking mechanism will then be in proper position for operation by the key to lock the front door, if desired. The spring mounting for the fulcrum pin 61 for the lever 60 will permit tripping operations without straining of the lever and cam structures.

The automatic undogging of the front door latch structure and the restoration of the key mechanism to normal position upon slamming shut of the front door, will result whether the rear door is open or shut, as the cam plate 115 will shift the pin 58 on the front door back to normal position before it reaches the door post flapper mechanism. Of course, after the front door has been swung shut and its locking structure restored to normal, the key mechanism may be operated to shift out the dogging plate 54 for locking of the front door and for operation by the pin 58 of the door post mechanism and the pin 101 of the rear door lock for locking of the rear door against either ingress or egress. A condition may arise where the front door is shut and locked either by the inside handle means, or by the key operated means, while the rear door is open. Under these conditions, swinging shut of the rear door should not result in locking of the rear door, so that the driver will not be locked out. I have therefore provided simple means for preventing such lockout. Referring to Figures 3 and 4, I have provided the locking pin 101 of the rear door with a notch 116 in its outer side for cooperation with the front edge of the passageway 102 through which the pin extends, the notch being normally in alignment with the passageway as shown on Figure 3. Under the conditions assumed, the door post transmission parts will be as shown by Figure 4. Now when the rear door is swung shut, the projected pin 101 will encounter the inclined portion 110' of the flapper lever 110 and will be moved laterally a distance away from the base wall 74 for engagement at its notch 116 with the front edge of the passageway 102 so that the pin will be held against longitudinal inward shift, and consequently the flapper structure is swung towards the front door and the pin 58 in the front door latch structure will be shifted in for undogging of the latch structure so that both doors will be unlocked and the driver cannot be locked out. If the driver now desires to lock the doors, he will operate the key mechanism on the front door. The ends of the notch 116 are sufficiently bevelled so that the notch will not interfere with the inward shifting of the pin 101 through the passageway 102 when the doors are to be locked after closure thereof.

Any suitable lock may be used for operation of the cam spindle 67, Figures 12 to 17 showing one type of lock which may be efficiently used. A desirable feature in the lock is the provision of spring operated means for returning the lock barrel to neutral position after a locking or unlocking operation thereof so that the key can be withdrawn only when the barrel is in neutral position.

The lock shown comprises the cylinder member 117 suitably mounted on the front door, the lock barrel 118 extending rearwardly of the cylinder and socketed to receive the head 119 on the end of the spindle 69 (Figure 1) so that the spindle has swivel connection with the barrel. The barrel has the circumferentially extending slot 120 receiving a pin 121 extending from the spindle head so that the barrel element of the lock may be turned relative to the spindle.

On the barrel element are two sleeves 122 and 123 having respectively the radially extending arms 124 and 125 engageable with opposite sides of a stop post 126 extending from the lock cylinder 117. A coil spring 127 surrounds the sleeves and hooks at one end around the arm 124 and its other end around the arm 125 of the respective sleeves, the spring tending to hold the arms against the opposite sides of the post 126.

When a key is inserted in the key hole 128 and the barrel is turned, the corresponding end of the slot 120 in the end of the barrel will engage the pin 121 for turning of the spindle 69 and corresponding operation of the lever 60 (Figure 1). During such rotation of the barrel, the spring 127 will be wound up and when the key is released, the spring will tend to rotate the barrel back to neutral position, but without any movement of the spindle 69.

Upon rotation of the barrel from neutral in the opposite direction, the spindle 69 will be correspondingly turned and the barrel will be returned to neutral position by the spring when the key is released. Rotation of the barrel in either direction from neutral is preferably 180° and after each such turning movement, release of the key will result in turning of the barrel back to neutral. Referring to Figure 1, turning of the key in counter-clockwise direction will swing the lever 60 for locking of the door latch structure, and the barrel will be automatically swung back by the spring 127 for withdrawal of the key from the lock. To unlock the doors, the key is turned in the opposite direction, and is returned to neutral position when released.

The locking installation on the left side of an automobile may be the same as on the right side, and if desired the key operable means may be omitted from the latch structure on the left front door so that the locking assembly on the left side of the automobile may be locked only by operation of the front door inside handle mechanism.

After the driver enters the vehicle he will swing up the inside handles on the two front doors for locking of the front doors against ingress and locking of both rear doors against either ingress or egress. Unlocking of all the doors will be accomplished by swing of the inside handles back to normal position.

If the driver desires to lock the car from the outside, he will, before leaving, swing up the inside handle on the left front door for locking of the doors on the left side, then after stepping out of the car he will swing the right front door shut and turn the key for locking of the doors on the right side. As has been fully explained, any unusual or abnormal manipulation, as setting of locking means before closure of doors, will automatically result in unlocking of the doors when swung shut so that the driver cannot lock himself out.

I have shown and described practical and efficient embodiments of the various features of my invention but I do not desire to be limited to the exact construction, arrangement and operation shown and described as changes and modifications may be made without departing from the scope of the invention.

I claim as follows:

1. A door lock structure comprising a latch bolt normally yieldably projected into latching position, an outside handle, actuating means operable by the outside handle for effecting retraction of the latch bolt, a dogging member, means key operable from the outside of the lock structure for setting said dogging member for dogging said actuating means to render it ineffective for operation by the outside handle, and means operable independently of said latch bolt for restoring said dogging member to undogging position and said key operable means to unlocking condition when the door on which the lock structure is applied has been swung shut after said key operable means has been operated for dogging of said actuating means by said dogging member.

2. A lock structure for the door of an automobile comprising a latch bolt, an outside door handle, actuating means operable by the outside door handle for retraction of said latch bolt, locking means key operable from the outside of the door for rendering said actuating means ineffective for operation by the outside handle, and means independent of said latch bolt operable entirely mechanically to reset said locking means to unlocking condition when said door is swung shut after said locking means has been set to locking condition.

3. A lock structure for an automobile door comprising a latch bolt, an outside handle, actuating means normally operable by said handle for retraction of the latch bolt, locking means, key means on the outside of the door displaced from said handle for setting said locking means to lock said actuating means against operation by the outside handle, and means independent of said latch bolt operable entirely mechanically upon swinging shut of the door to reset said locking mechanism and key means to unlocking position if the locking and key means had been set to locking position before the door was swung shut.

4. A lock structure for an automobile door comprising a latch bolt, an outside handle structure normally effective to withdraw said latch bolt, locking means key operable from the outside of the door for locking said handle structure against unlatching thereby of the latch bolt, and mechanical parts cooperable independently of said latch bolt for unlocking said locking means when the door is swung shut after said locking means has been set to locking position.

5. A lock structure for an automobile door comprising a latch bolt, an outside handle and a roll-back normally operable thereby for retraction of the latch bolt, locking means key operable from the outside of the door for locking said roll-back against unlatching movement by said handle, and means independent of said latch bolt mechanically operable to reset said locking means to unlocking position when the door is swung shut after said locking means has been set to locking position.

6. A lock structure for a vehicle door comprising latch means adapted when said door is closed to hold it closed, release means for said latching means operable from the outside of the door, locking means controllable from the outside of the door for rendering said release means ineffective to release said latch means, and a resetting element on said locking structure and an element on the vehicle body mechanically cooperable to reset said locking mechanism to unlock said release means upon swinging shut of the door after said locking means has been set to lock said release means.

7. A lock structure for an automobile door comprising a latch structure, an outside handle, actuating means normally operable by said handle to retract the latch bolt, a shiftable dogging member for dogging said actuating means against retraction operation thereof by said handle, locking means operable from outside of the door to shift said dogging member to dogging position, a resetting member shifted outwardly from the edge of the door when said dog is shifted to dogging position, and means on the car body cooperable with said resetting means to reset said locking means to unlocking position and dogging means to undogging position when the door is swung shut after said locking mechanism has been set for dogging of the actuating means, whereby the door after being closed will be unlocked for reopening by operation of said handle.

8. A lock structure for an automobile door comprising a latch bolt, a control operable from the outside of the door for effecting unlatching of the bolt for opening of the door, locking means for said control means operable from outside of the door to lock said control means against latch bolt retraction, resetting means projected from the edge of the door by the locking means when said locking means is set to locking position, and means in an adjacent part of the door frame engageable by said resetting means to reset the locking means to unlocking position when said door is swung shut after said locking means has been set to locking condition.

9. Locking structure for the door of an automobile comprising a latch bolt, an outside handle, retraction means for said latch bolt operable by said outside handle, a shiftable locking member for said retraction means, a lever and a cam for actuating said lever to shift said locking member into locking position, actuating means for said cam key operable from the outside of the door, a pin shifted outwardly beyond the door edge upon setting of the locking member to locking position by said lever, a relatively stationary part outside of said lock structure engaged by said pin to cause said pin to be shifted inwardly when the door is swung shut after the locking member has been set to lock the retraction means while the door was open, such inward shift of the pin causing resetting of the locking member to unlocking position and causing reverse swing of the lever, and means whereby swing of said lever will effect the return of said key operated cam and said lever to normal position, whereby to prevent lockout.

10. A lock structure for an automobile door, comprising a latch bolt, an outside handle, retraction means operable by said outside handle for retraction of the latch bolt, a shiftable locking member for locking said retraction means, a lever having a fulcrum support intermediate its ends, one end of said lever being cooperable with said locking member to shift it into locking position to lock the retraction means, a cam cooperable with the other end of said lever, key means operable from the outside of the door for setting said cam to hold said lever in locking position, a pin extending from said locking member for projection beyond the door edge when said locking member is shifted to locking position by said lever, a stationary cam member engageable by the projected pin when the door is swung shut after the key operable cam has been set for shift of the locking member to locking position by said lever while the door was open, engagement of said stationary cam member by said pin causing said pin to be shifted inwardly to its normal position and return of the locking member to unlocking position, the fulcrum support intermediate the ends of said lever being shiftable inwardly, and spring means tending to hold said fulcrum support in its normal position for operation of said cam to set said lever for shift of the locking member to locking position, inward shift of said pin by said stationary cam member tending to swing said lever back to normal position, said spring permitting inward shift of the lever fulcrum support.

11. A lock structure for an automobile door, comprising a latch bolt, an outside handle, retraction means operable by said outside handle for retraction of the latch bolt, a shiftable locking member for locking said retraction means, a lever having a fulcrum support intermediate its ends, one end of said lever being cooperable with said locking member to shift it into locking position to lock the retraction means, a cam cooperable with the other end of said lever, key means operable from the outside of the door for setting said cam to hold said lever in locking position, a pin extending from said locking member for projection beyond the door edge when said locking member is shifted to locking position by said lever, a stationary cam member engageable by the projected pin when the door is swung shut after the cam has been set for shift of the locking member to locking position by said lever while the door was open, engagement of said cam member by said pin causing said pin to be shifted inwardly to its normal position and return of the locking member to unlocking position, the fulcrum support intermediate the ends of said lever being shiftable inwardly, spring means tending to hold said fulcrum support in its normal position for operation of said cam to set said lever for shift of the locking member to locking position, inward shift of said pin by said stationary cam member tending to swing said lever back to normal position, said spring permitting inward shift of the lever fulcrum support, and means operable by the shift of the lever fulcrum support for restoring said key operated lever setting cam to normal position whereby the lever fulcrum support may be returned by the spring to its normal position.

12. Lock structure for a vehicle door comprising a latch bolt cooperable with the door frame to hold the door closed, a handle and retraction means normally operable thereby for retraction of the latch bolt, locking means on the lock structure operable by a key from the outside of the door for locking said retraction means to prevent retraction of the latch bolt by the handle, a pin connected with the locking means and shiftable thereby beyond the edge of the lock structure and the door when the locking mechanism is set to locking position, and a cam member on the door frame engaged by said pin to cause the pin to be shifted inwardly to restore the locking means to unlocking position when the door is swung shut after said locking means has been set to locking position while the door was open, whereby to prevent lockout.

13. Locking structure for adjacent front and rear doors of an automobile comprising a lock structure on each door having a latch bolt adapted to be operated by either an inside or an outside operating means, retraction means for each lock structure normally operable by the outside operating means thereof for retraction of the latch bolt, a locking member in the front door lock structure shiftable by operation of the inside operating means to project beyond the edge of the door, transmission means in the door frame between the doors operated by the projected locking member, a locking member in the rear door lock structure normally projecting beyond the edge of the lock structure and the door into the path of said transmission means whereby said locking member will be shifted inwardly upon outward shift of the locking member in the front door lock structure, a slide member in the rear door lock structure between the retraction means and the latch bolt, said slide member being normally shiftable by the retraction means for engagement with the latch bolt for retraction thereof and being also shiftable by operation of the inside handle for retraction of the latch bolt, an abutment on said slide member, and a dogging lever movable by the inward shifting of said locking member into the path of said slide member abutment to dog it against bolt retraction movement.

14. Locking structure for adjacent doors of an automobile comprising a lock structure for each door having a latch bolt adapted for operation by either an inside or outside operating means, a retractor member in the rear door lock structure engageable with the latch bolt and directly operable by the inside operating means for retraction of the bolt, a roll-back in the rear door lock structure operable by the outside handle for movement of the retractor member to unlatch the bolt, a dogging member for said retractor member, and a train of mechanical parts between the inside operating means for the front door locking structure and said dogging member for setting said dogging member to dog the retracting member whereby to prevent unlatching of the rear door latch bolt by operation of either the inside or the outside operating means.

15. Locking structure for adjacent doors of an automobile comprising a lock structure for each door having a latch bolt adapted for operation by either an inside or an outside operating means, a retractor member in the rear door lock structure engageable with the latch bolt and directly operable by the inside operating means for retraction of the bolt, a roll-back in the rear door structure operable by the outside operating means for movement of the retractor member to unlatch the bolt, a dogging member for said retractor member, a train of mechanical parts between the inside operating means for the front door locking structure and said dogging member for setting said dogging member to dog the retracting member whereby to prevent unlatching of the rear door latch bolt by operation of either the inside or the outside operating means, retraction means in the front door lock structure operable by the outside operating means thereof for retraction of the latch bolt, and means included in said train for rendering said retraction means ineffective to unlatch the bolt.

16. Locking structure for adjacent front and rear doors of an automobile comprising a lock structure on each door having a latch bolt adapted normally to be operated by either an outside operating means or an inside operating means, a locking means in the front door lock structure projectible through the edge of the lock structure and the door by operation of the inside operating means, transmission means within the door frame between the doors shifted towards the rear door lock structure by the projected locking member in the front door lock structure when both doors are in closed position, a retractor plate in the rear door lock structure shiftable by the inside operating means for unlatching of the latch bolt, a roll-back for the outside operating means of the rear door lock structure engageable with said retractor plate for retraction of the latch bolt, a dogging element for said retractor plate, a locking member within the rear door lock structure normally projecting from the edge of the lock structure and the door into the path of said transmission means in the door frame, said locking member in the rear door lock structure being shifted inwardly by the transmission means when said transmission means is set by the locking means in the front door locking structure, and means whereby shifting of the locking member in the rear door locking structure will set said dogging member for dogging of the retractor plate to thereby prevent retraction of the latch bolt by either operating means.

17. Locking control for two doors of an automobile comprising a lock structure on each door including a latch bolt, means controllable from one door to effect coincidental locking of both doors by said lock structures when both doors are in closed position, and means whereby, when one door is closed and locked while the other door is open, slamming shut of said other door will unlock the locked door independently of movement of said latch bolt on said other door.

18. Locking control for two doors of an automobile cmprising a lock structure on each door including a latch bolt, transmission means actuated by the locking of one door by its lock structure when in closed position tending to effect locking of the other door by its lock structure when the other door is in closed position, and means on said other door effective, when said other door is swung from open position to closed position after said first door is locked while said other door is open, to operate said transmission means to effect unlocking of the locked door independently of movement of the latch bolt on said other door.

19. Locking control for two doors of an automobile comprising transmission means between said doors, means on one door operable to lock said door in closed position and to set said transmission means in locking position, locking means on the other door including a latch bolt and controlling means for said locking means, said locking control means on said other door being operable by said transmission means for locking of said door when said door is in closed position when said transmission is set to locking position, and means effective, when said other door is swung from open position to closed position after said transmission means has been set to locking position while said other door was open, to actuate said transmission means to cause unlocking of the first door independently of movement of said latch bolt.

20. Locking control for two doors of an automobile comprising locking means for each door, transmission means between said doors, means for setting said transmission means to locking position when one of said doors is locked while in closed position, controlling means for the locking means of the other door, said controlling means being movable by said transmission means to effect locking of said other door when said transmission means is set to locking position by the locking of the first door while said other door is closed whereby both doors will then be locked, and means rendered effective by the engagement of said controlling means with the said transmission means when the other door is swung from open position to closed position after said transmission means has been set to locking position while said other door was open, to hold said control means against locking of said other door and thereby to cause restoring of said transmission means to normal position to effect unlocking of the first door.

EDWARD D. DALL.